US008279850B2

(12) United States Patent
Elias et al.

(10) Patent No.: US 8,279,850 B2
(45) Date of Patent: Oct. 2, 2012

(54) METHODS AND APPARATUS TO IMPLEMENT VOICE OVER INTERNET PROTOCOL (VOIP) PHONES

(75) Inventors: Mark Anthony Elias, Eastpointe, MI (US); Robert Paul Lowmaster, Bartlett, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1213 days.

(21) Appl. No.: 11/368,810

(22) Filed: Mar. 6, 2006

(65) Prior Publication Data

US 2007/0206567 A1  Sep. 6, 2007

(51) Int. Cl.
H04L 12/66 (2006.01)
H05K 7/10 (2006.01)
G06F 3/00 (2006.01)

(52) U.S. Cl. .................. 370/352; 710/301; 719/321
(58) Field of Classification Search .................. 719/321, 719/322, 327
See application file for complete search history.

(56) References Cited

U.S. PATENT DOCUMENTS

| 5,799,068 | A * | 8/1998 | Kikinis et al. ............. 379/93.06 |
| 5,819,115 | A * | 10/1998 | Hoese et al. .................... 710/68 |
| 6,763,226 | B1 | 7/2004 | McZeal, Jr. |
| 6,826,174 | B1 | 11/2004 | Erekson et al. |
| 7,216,365 | B2 * | 5/2007 | Bhagwat et al. ................. 726/23 |
| 2001/0029186 | A1 | 10/2001 | Canyon et al. |
| 2002/0031120 | A1 * | 3/2002 | Rakib ............................ 370/386 |
| 2004/0090949 | A1 | 5/2004 | So et al. |
| 2004/0148395 | A1 | 7/2004 | Schulzrinne |
| 2004/0203680 | A1 | 10/2004 | Sylvain |
| 2004/0204898 | A1 * | 10/2004 | Huang et al. ................... 702/127 |
| 2004/0259541 | A1 | 12/2004 | Hicks, III et al. |
| 2005/0002367 | A1 * | 1/2005 | Tordera ......................... 370/338 |
| 2005/0021868 | A1 | 1/2005 | Sharma et al. |
| 2005/0064853 | A1 | 3/2005 | Radpour |
| 2005/0089052 | A1 * | 4/2005 | Chen et al. ..................... 370/401 |
| 2005/0101342 | A1 | 5/2005 | Chuang |
| 2005/0117566 | A1 | 6/2005 | Davidson |
| 2005/0147049 | A1 | 7/2005 | Ganesan |
| 2005/0157691 | A1 | 7/2005 | Stewart et al. |
| 2005/0216949 | A1 | 9/2005 | Candelora et al. |
| 2005/0286466 | A1 | 12/2005 | Tagg et al. |
| 2006/0043164 | A1 | 3/2006 | Dowling et al. |
| 2006/0112386 | A1 * | 5/2006 | Moon et al. .................... 717/174 |
| 2007/0036140 | A1 * | 2/2007 | Nejah ........................... 370/352 |

OTHER PUBLICATIONS

The International Search Report corresponding to counterpart International Application No. PCT/US07/05206, mailed Dec. 5, 2007, 2 pages.
The International Written Opinion corresponding to counterpart International Application No. PCT/US07/05206, mailed Dec. 5, 2007, 5 pages.
The PCT International Preliminary Report on Patentability and Written Opinion mailed on Sep. 18, 2008 corresponding to counterpart International Application No. PCT/US20071005206 (7 pages).

* cited by examiner

*Primary Examiner* — Melanie Jagannathan
*Assistant Examiner* — Joel Hamel
(74) *Attorney, Agent, or Firm* — Hanley, Flight & Zimmerman, LLC

(57) ABSTRACT

Methods and apparatus to implement voice over Internet protocol (VoIP) phones are disclosed. A disclosed example VoIP phone comprises a phone housing, a voice over Internet protocol (VoIP) processor located in the phone housing, and a bay defined in the phone housing and dimensioned to receive a user-replaceable network interface.

21 Claims, 4 Drawing Sheets

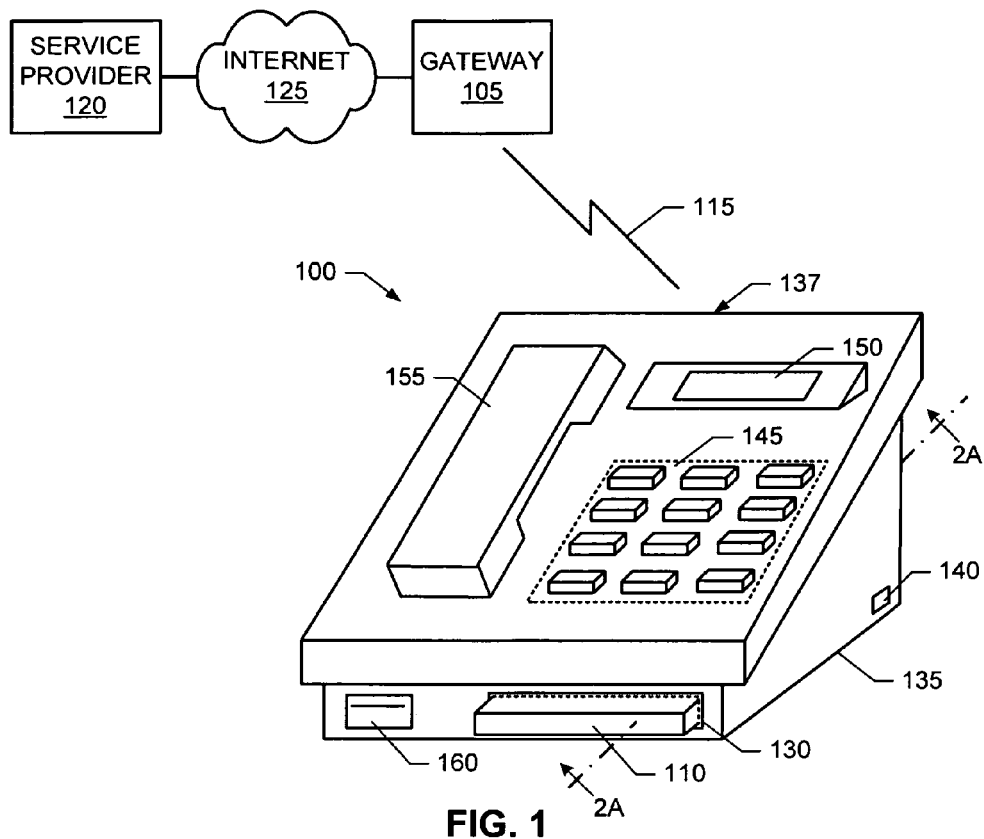
FIG. 1
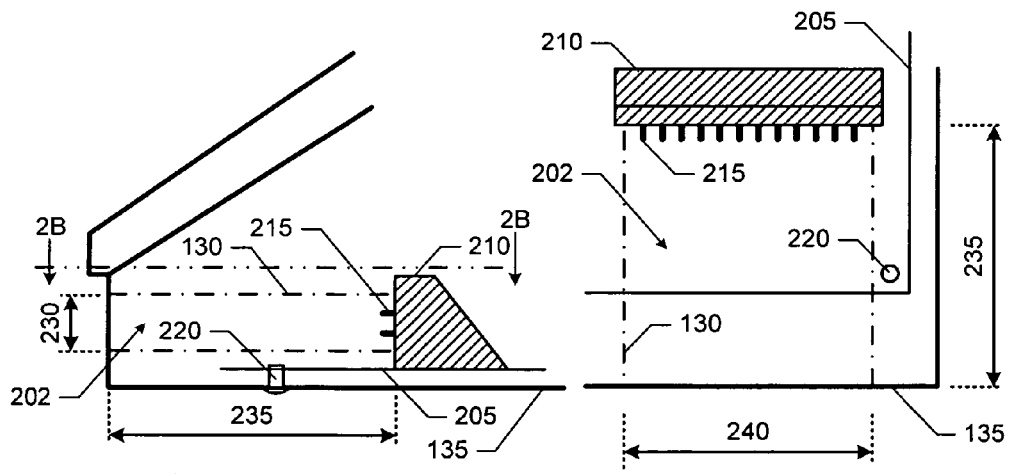
FIG. 2A
FIG. 2B

METHODS AND APPARATUS TO IMPLEMENT VOICE OVER INTERNET PROTOCOL (VOIP) PHONES

FIELD OF THE DISCLOSURE

This disclosure relates generally to voice over Internet protocol (VoIP) phones and, more particularly, to methods and apparatus to implement VoIP phones.

BACKGROUND

Today, voice over Internet protocol (VoIP) devices (e.g., phones, adapters, etc.) are implemented with fixed network interfaces.

BRIEF DESCRIPTION OF THE DRAWINGS

FIG. 1 is a schematic illustration of an example voice over Internet protocol (VoIP) communication system including an example VoIP phone.

FIG. 2A is a cutaway view of the example VoIP phone of FIG. 1 taken along line 2A-2A.

FIG. 2B is a cutaway view taken along line 2B-2B of FIG. 2A.

DETAILED DESCRIPTION

Figure 3:
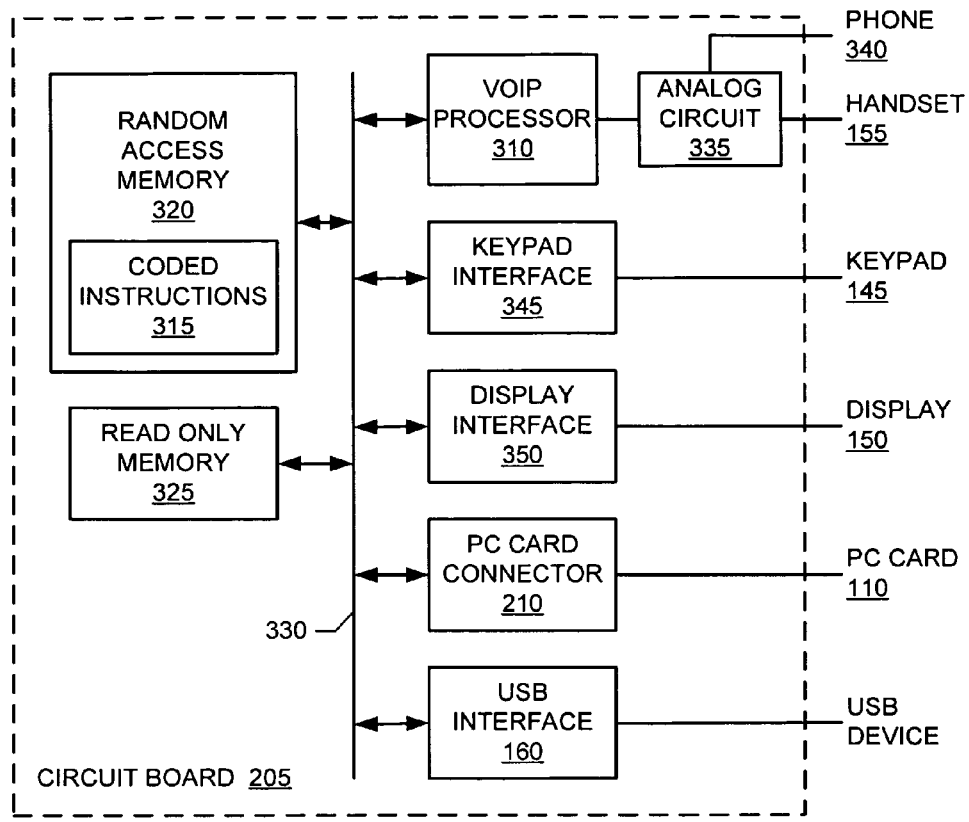
FIG. 3 is a block diagram illustrating an example manner of implementing electronics for the example VoIP phone of FIG. 1.

Methods and apparatus to implement voice over Internet protocol (VoIP) phones are disclosed. A disclosed example VoIP phone includes a phone housing, a voice over Internet protocol (VoIP) processor located in the phone housing, and a bay defined in the phone housing and dimensioned to receive a user-replaceable network interface.

A disclosed example method includes detecting insertion of a user-replaceable network interface into a voice over Internet protocol (VoIP) device via an externally accessible port defined in a phone housing of the device, and transmitting packetized data via the user-replaceable network interface to a VoIP gateway. A disclosed example method of using a VoIP phone includes inserting a PC card through an opening defined in a phone housing of a voice over Internet protocol (VoIP) phone; and electrically coupling the inserted PC card to a connector located adjacent the opening in the phone housing, the PC card to communicatively couple the VoIP device to a VoIP gateway.

FIG. 1 is a schematic illustration of an example voice over Internet protocol (VoIP) communication system. To allow a user to place and/or receive a VoIP based telephone call, the example communication system of FIG. 1 includes a VoIP phone 100 constructed in accordance with the teachings of the invention.

To communicatively couple the example VoIP phone 100 to any variety of VoIP device such as, for example, a VoIP gateway 105, the example VoIP phone 100 of FIG. 1 includes any variety of user-replaceable network interface 110. The example user-replaceable network interface 100 of FIG. 1 communicatively couples the example VoIP phone 100 to the example VoIP gateway 105 via any variety of wireless communication signal(s) 115. In the illustrated example, the example wireless communication signal(s) 115 are transmitted and/or received in accordance with any variety of wireless local area network (WLAN) standards such as, for example, the Institute of Electrical and Electronics Engineers (IEEE) 802.11, 802.11a, 802.11b, 802.1g, etc. (i.e., 802.11x) standards. Persons of ordinary skill in the art will readily appreciate that any presently known or future developed WLAN standard and/or communication protocol, communication signal and/or communication interface may be implemented between the example VoIP gateway 105 and the example VoIP phone 100.

In the example system of FIG. 1, the example VoIP gateway 105 is communicatively coupled to any variety of VoIP service provider 120 via any variety of communication network such as, for example, the Internet 125. In the illustrated example of FIG. 1, the example VoIP service provider 120 is located at a first location (e.g., a central office or other communication service provider facility) while the example VoIP gateway 105 and the example VoIP phone 100 are located at a second location remote from the first location such as, for example, a residence or place-of-business.

To allow the user-replaceable network interface 110 to be inserted into the example VoIP phone 100, the example VoIP phone 100 of FIG. 1 includes a bay 130 defined in a base 135 of a phone housing 137 of the example VoIP phone 100. The example bay 130 of FIG. 1 is dimensioned to receive the example user-replaceable network interface 110. The example user-replaceable network interface 110 of FIG. 1 has a form factor in accordance with the personal computer memory card international association (PCMCIA) standard. Such devices are commonly referred to in the industry as personal computer (PC) Cards and are purposefully designed to be user-replaceable. PC Cards come in a variety of standardized sizes (i.e., types). In the illustrated example, the user-replaceable network interface 110 of FIG. 1 is implemented as a Type II PC Card.

To provide electrical power for the example VoIP phone 100 of FIG. 1, the example VoIP phone 100 includes any variety of power connector 140. Depending upon the implementation of the example VoIP phone 100, the example power connector 140 of FIG. 1 may connect the example VoIP phone 100 to any variety of alternating current (AC) or direct current (DC) power sources. The example power connector 140 is structured to connect the example VoIP phone 100 to an AC-to-DC power conversion adapter.

To allow a person to, among other things, dial a telephone number, the example VoIP phone 100 of FIG. 1 includes any variety of keypad 145 containing any number and/or variety of keys. An example keypad 145 includes four (4) rows with three (3) keys per row. The example keypad 145 of FIG. 1 may include any variety and/or number of additional keys to control advance features of the example VoIP phone 100 such as, for example, speed dialing, access to voicemail, etc.

To allow a person to view information (e.g., the telephone number of an incoming telephone call), the example VoIP phone 100 of FIG. 1 includes any variety of display 150. An example display 150 is a liquid crystal display (LCD) capable of displaying alphanumeric characters.

To allow a person to participate in a telephone call, the example VoIP phone 100 of FIG. 1 includes any variety of handset 155. The example handset 155 of FIG. 1 includes any variety of speaker and any variety of microphone, and is connected to the example base 135 of the example VoIP phone 100 via any variety of communication cable (e.g., a conventional coiled telephone cable). Additionally or alternatively, any variety of cordless handset may be communicatively coupled to the example base 135 via any variety of cordless communication techniques and/or signals such as, for example, 900 Mhz, 2.4 Ghz, and/or 5.8 Ghz cordless handsets. That is, the example VoIP phone 100 of FIG. 1 may connect with any variety and/or combination of corded and/or cordless handsets. For instance, an example VoIP phone may include both a corded handset and a cordless handset. Additionally, the example VoIP phone 100 of FIG. 1 may implement any number of VoIP telephone lines. Moreover, the example VoIP phone 100 of FIG. 1 may implement, in addition to any number of VoIP phone lines, any number of public switched telephone network (PSTN) based phone lines. Still further, the example VoIP phone 100 of FIG. 1 may initially implement PSTN based phone lines until such a time that a user-replaceable network interface is inserted to enable VoIP functionality.

It will be readily apparent to persons of ordinary skill in the art that the example VoIP phone 100 of FIG. 1 can alternatively be adapted to implement a VoIP adapter. For example, the example keypad 145, the example display 150 and the example handset 155 could be implemented by any variety of conventional PSTN-based telephone. Further, the example base 135 could include any variety of circuit such as, for example, a subscriber line interface circuit (SLIC) to allow the conventional PSTN-based phone to be communicatively coupled to a VoIP adapter that includes the user-replaceable network interface 110 of FIG. 1.

To allow a person to provide (e.g., download), for example, a software driver for the example user-replaceable network interface 110, the example VoIP phone 100 includes any variety of computer interface such as, for example, a universal serial bus (USB) interface 160. Downloaded software drivers are used to facilitate communication between the example user-replaceable network interface 110 and electronics implemented on, for example, a circuit board contained within the example phone housing 137. An example manner of implementing a portion of the electronics for the example VoIP phone 100 of FIG. 1 is discussed below in connection with FIG. 3.

While the following discussion refers to the example VoIP phone 100 of FIG. 1, persons of ordinary skill in the art will readily appreciate that the methods and apparatus disclosed herein may be applied to implement any variety of VoIP phone and/or VoIP adapter including any variety of user-replaceable network interface. For example, the housing 137 could be readily adapted to implement any variety of housing(s) suitable for a VoIP adapter (i.e., a VoIP adapter housing). Further, while a particular phone housing having a particular form factor is illustrated in FIG. 1, VoIP phones (corded or cordless) and/or VoIP adapter housings including a user-replaceable network interface may be implemented in any variety, size and/or shape of housing. Moreover, while the example VoIP phone 100 of FIG. 1 is principally designed to implement VoIP functionality (i.e., a dedicated VoIP phone), persons of ordinary skill in the art will readily appreciate that the VoIP phone 100 may additionally include and/or implement non-VoIP functionality such as, for example, a clock.

FIGS. 2A and 2B are cross sectional views of portions of the example VoIP phone 100 of FIG. 1. FIG. 2A is a side cutaway view of a portion of the example base 135 taken along line 2A-2A of FIG. 1. FIG. 2B is a top cutaway view of a portion of the example base 135 taken along line 2B-2B of FIG. 2A. For ease of understanding, like elements in FIGS. 1, 2A and 2B have been numbered with like reference numerals in FIGS. 1, 2A and 2B.

The example bay 130 of FIGS. 1, 2A and 2B define a space 202 in which the example user-replaceable network interface 110 of FIG. 1 may be located. To allow electronics and/or devices in an inserted user-replaceable network interface 110 (i.e., PC Card 110) to communicate with electronics and/or devices of a circuit board 205 (e.g., the example VoIP processor discussed below in connection with FIG. 4), the example circuit board 205 of FIGS. 2A-B includes any variety of PC Card connector 210.

As illustrated in FIGS. 2A-B, the example PC Card connector 210 includes conventional male connecting pins 215 to mate with conventional female pin receptacles located in the PC Card 110. The pattern, number and/or position of the connecting pins 215 of the PC Card connector 210 correspond to the type(s) of PC Card (e.g., Type II) supported by the example VoIP phone 100. The example connecting pins 215 and the pin receptacles of an inserted PC Card 110 provide an electrically conductive path between the electronics of the inserted PC Card 110 and the devices of the example circuit board 205. The example PC Card connector 210 of FIG. 2A-B is aligned and/or positioned relative to the example bay 130 (i.e., the space 202) such that, when a PC Card 110 is inserted into the example bay 130, the connecting pins 215 mate with correct pin receptacles of the inserted PC Card 110. While not shown, the example bay 130 may include any number and/or variety of groves, ridges, guides, etc. suitable to assist in the alignment of an inserted PC Card 110 and the PC Card connector 210.

To mount and/or otherwise hold the example circuit board 205 of FIG. 2A-B in place inside the example phone housing 137 and/or in correct alignment with the example bay 130, the example circuit board 205 is attached to the example base 135 using any variety and/or number of mechanical or chemical fasteners 220 such as, for example, a bolt, a screw, a grommet, a rivet, glue, etc.

The example bay 130 of FIGS. 1 and 2A-B is dimensioned to correspond to the dimensions of the type(s) of PC Cards (e.g., Type II) supported by the example VoIP phone 100 of FIGS. 1 and 2A-B. In particular, a height 230 of the space 202 illustrated in FIG. 2A corresponds substantially to the nominal thickness of the supported PC Card type(s). A depth 235 of the example space 202 illustrated in FIGS. 2A and 2B correspond to the nominal length of the supported PC Card type(s) minus an amount by which an inserted PC Card 110 is to intentionally protrude from the example phone housing 135. The protrusion of an inserted PC card from the example phone housing 135 allows a person to firmly grasp and remove the user-replaceable PC Card 110. A width 240 of the example space 202 illustrated in FIG. 2B corresponds to the nominal width of the supported PC Card type(s). Alternatively, a PC card 110 does not protrude from the phone housing 137 when inserted and the phone housing 137 includes some means to eject an inserted PC Card 110. Further still, the phone housing 137 would include a door or cover to conceal and/or obscure an inserted PC Card 110.

FIG. 3 illustrates an example manner of implementing a portion of the electronics for the example VoIP phone 100 of FIG. 1, that is, an example portion of the example circuit board 205 of FIGS. 2A and 2B. To handle VoIP processing functions, the example circuit board 205 of FIG. 3 includes any variety of VoIP processor 310. The example VoIP processor 310 of FIG. 3 implements, among other things, coding, decoding, packetization and de-packetization of speech signals for the example VoIP phone 100 of FIG. 1. An example manner of implementing the example VoIP processor 310 of FIG. 3 is discussed below in connection with FIG. 4.

Among other things, the VoIP processor 310 of FIG. 3 executes coded instructions 315 present in a main memory of the VoIP processor 310 (e.g., within a random access memory (RAM) 320). As discussed below in connection with FIG. 4, the example VoIP processor 310 may include any type of general purpose controller and/or processing unit 425. The general purpose controller and/or processing unit 425 may carry out, among other things, the example machine accessible instructions of FIG. 6 to implement a portion of the example VoIP phone 100 of FIG. 1.

The example VoIP processor 310 is in communication with the main memory (including a read only memory (ROM) 325 and the RAM 320) and other devices and/or modules of the example circuit board 205 of FIG. 3 via any type and/or number of buses 330. The example RAM 320 may be implemented by, for example, DRAM, SDRAM, and/or any other type of RAM device, and the example ROM 325 may be implemented by, for example, flash memory and/or any other desired type of memory device. Access to the example memory 320 and 325 is typically controlled by a memory controller (not shown) in a conventional manner.

To electrically couple signals between a handset (e.g., the example handset 155 of FIG. 1) and the example VoIP processor 310, the example circuit board 205 of FIG. 3 includes any variety of analog circuit 335. An example analog circuit 335 includes any variety of filters, analog-to-digital converters and/or digital-to-analog converters to convert between analog signals sent to or received from the example handset 155 and digital signals sent to or received from the example VoIP processor 310.

Additionally or alternatively, the example analog circuit 335 of FIG. 3 may implement any variety of wireless communication technologies to communicatively couple the example VoIP processor 310 with any variety of cordless handset. Moreover, the example analog circuit 335 of FIG. 3 may, additionally or alternatively, implement any variety of SLIC to allow any variety of PSTN-based telephone to be electrically coupled to the example VoIP processor 310 of FIG. 3. The latter example would be used, for instance, in implementations where the circuit board 205 is located in a VoIP adapter.

To facilitate user inputs via any variety of keypad (e.g., the example keypad 145 of FIG. 1), the example circuit board 205 of FIG. 3 includes any variety of keypad interface 345. The example keypad interface 345 of FIG. 3 electrically couples and/or translates electrical signals conveying key press information from the example keypad 145 to the example VoIP processor 310.

To provide output information to a user via any variety of display (e.g., the example display 150 of FIG. 1), the example circuit board 205 of FIG. 3 includes any variety of display interface 350. An example display interface 350 receives information (e.g., alphanumeric characters) to be displayed from the example VoIP processor 310 and creates electrical signals suitable for displaying the information on the example display 150.

To electrically couple a user-replaceable network interface (e.g., the example PC Card 110 of FIG. 1) to the example VoIP processor 310, the example circuit board 205 includes the example PC Card connector 210 of FIGS. 2A and 2B. The example VoIP processor 310 and an inserted PC Card 110 communicate via, for example, the example bus 330. In particular, the example VoIP processor 310 transmits packetized and/or encoded data to the example VoIP gateway 105 of FIG. 1 via the example PC Card connector 210 and an inserted user-replaceable network interface 110. Likewise, the VoIP processor 310 receives packetized and/or encoded data via the example PC Card connector 210 and the example PC Card 110. That is, the example PC Card 110 implements a network interface for the VoIP processor 310 of FIG. 3.

As discussed above in connection with FIG. 1, to allow a person to provide (e.g., download), for example, a software driver for the example user-replaceable network interface 110, the example circuit board 205 of FIG. 3 includes any variety of computer interface such as, for example, the example USB interface 160 of FIG. 1.

Although example electronics for the example VoIP phone 100 of FIG. 1 have been illustrated in FIG. 3, VoIP phones may be implemented using any of a variety of other and/or additional devices, components, circuits, modules, etc. Further, the devices, components, circuits, modules, elements, etc. illustrated in FIG. 3 may be combined, re-arranged, eliminated and/or implemented in any of a variety of ways. Additionally, the example VoIP processor 310, the example keypad interface 345, the example display 350, the example PC Card connector 210 and/or the example USB interface 160 may be implemented as any combination firmware, software and/or hardware. For simplicity and ease of understanding, the following discussion references the illustrated example of FIG. 3, but any VoIP device supporting a user-replaceable network interface could be used.

Figure 4:
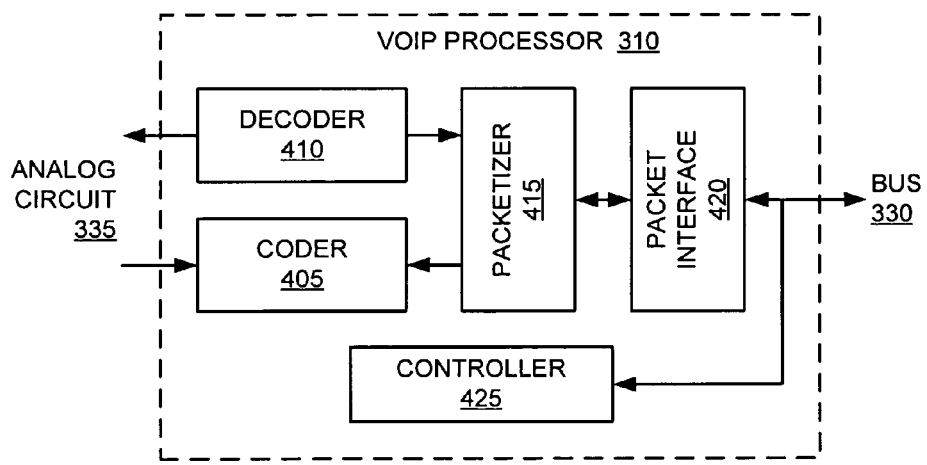
FIG. 4 illustrates an example manner of implementing the example VoIP processor of FIG. 3.

FIG. 4 illustrates an example manner of implementing the example VoIP processor of FIG. 3. To encode signals received from, for example, the example handset 155 via the example analog circuit 335 of FIG. 3, the example VoIP processor 310 of FIG. 4 includes any variety of coder 405. The example coder 405 of FIG. 4 encodes and/or compresses received signals using any variety of techniques and/or algorithms.

To decode signals received from the PC Card 110 and destined for, for example, the example handset 155, the example VoIP processor 310 of FIG. 4 includes any variety of decoder 405. The example decoder 405 of FIG. 4 decodes and/or decompresses received signals using any variety of techniques and/or algorithms.

To packetize encoded and/or compressed signals generated by the example coder 405, the example VoIP processor 310 of FIG. 4 includes any variety of packetizer 415. The example packetizer 415 of FIG. 4 packetizes encoded and/or compressed signals into data packets suitable for transmission via the example user-replaceable network interface 110 to the example VoIP gateway 105. The example packetizer 415 likewise depacketizes data packets received via the user-replaceable network interface 110.

To provide a data packet based interface between the example VoIP processor 310 and the example PC Card 110, the example VoIP processor 310 of FIG. 4 includes any variety of packet interface 420. The example packet interface 420 implements any variety of software driver, protocol translation, etc. between the example packetizer 415 and the user-replaceable network interface 110. An example packet interface 420 executes machine accessible instructions such as, for example, a software driver downloaded to the example VoIP phone 110 via, for example, the example USB interface 160.

To provide general purpose control for the example VoIP phone 100, the example VoIP processor 310 of FIG. 4 includes any variety of general purpose controller and/or processor 425. The example controller 425 of FIG. 4 executes coded instructions (e.g., the coded instructions 315 of FIG. 3) present in a memory of the controller 425 (e.g., the example memory 320 and/or 325 of FIG. 3). For example, the coded instructions may be executed to, for instance, carry out the example process illustrated in FIG. 6. The example controller 425 of FIG. 4 may be any type of processing unit, such as, for example, a processor core, a microcontroller, or a microprocessor.

Although an example VoIP processor 310 has been illustrated in FIG. 4, VoIP processors may be implemented using any of a variety of other and/or additional devices, components, circuits, modules, etc. Further, the devices, components, circuits, modules, elements, etc. illustrated in FIG. 4 may be combined, re-arranged, eliminated and/or implemented in any of a variety of ways. Further still, while the example VoIP processor 310 is principally designed to implement VoIP functionality (i.e., a dedicated VoIP processor), persons of ordinary skill in the art will readily appreciate that the VoIP processor 310 may additionally include and/or implement any variety of non-VoIP and/or general purpose functionality such, for example, a clock. Additionally, the example coder 405, the example decoder 410, the example packetizer 415, the example packet interface 420 and the example controller 425 may be implemented manually or as any combination firmware, software and/or hardware. For simplicity and ease of understanding, the following discussion references the illustrated example VoIP processor 310 of FIG. 4, but any VoIP processor could be used.

Figure 5:
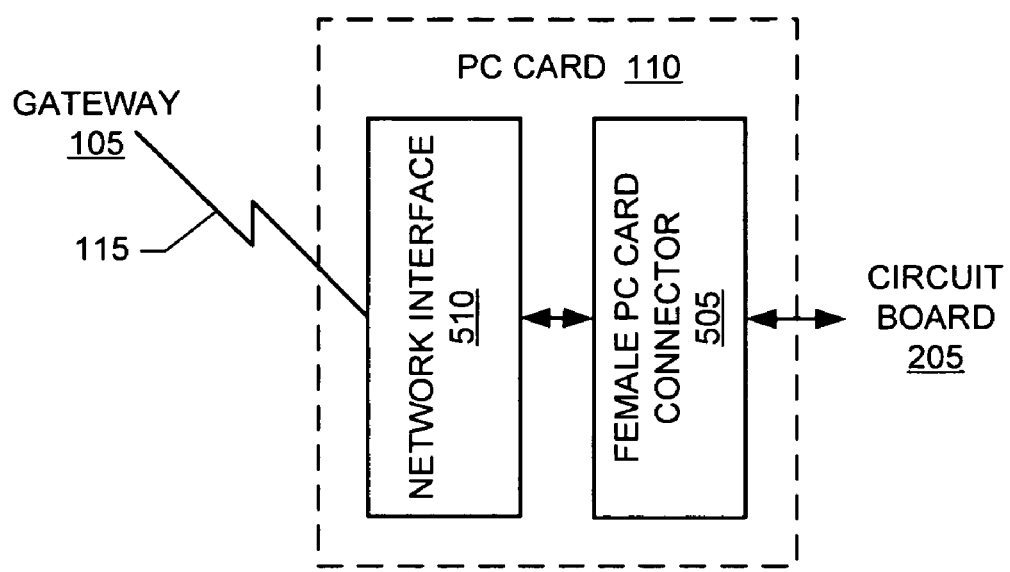
FIG. 5 is a block diagram illustrating an example manner of implementing the example user-replaceable network interface of FIG. 1.

FIG. 5 illustrates an example manner of implementing the example user-replaceable network interface 110 of FIG. 1. To electrically couple the example PC Card 110 of FIG. 5 to the example circuit board 205 of FIG. 3, the PC Card 110 includes an example PC Card connector 505. As discussed above in connection with FIG. 2A, the example PC Card connector 505 of FIG. 5 includes conventional female receptacles to mate with the connecting pins 215 of the example PC Card connector 210 of FIG. 2A to provide an electrically conductive path between the electronics of the PC Card 110 and the devices of the example circuit board 205. The pattern, number and/or position of the female receptacles of the example PC Card connector 505 correspond to the type of PC Card (e.g., Type II) implemented by the example PC Card 110.

To transmit data to and/or received data from the example gateway 105 of FIG. 1, the example PC Card 110 of FIG. 5 includes any variety of network interface 510. The example network interface 510 of FIG. 5 communicatively couples the example VoIP phone 100 to the example VoIP gateway 105 via any variety of wireless communication signal(s) 115. In the illustrated example, the example wireless communication signal(s) 115 are transmitted and/or received in accordance with any variety of wireless local area network (WLAN) standards such as, for example, the Institute of Electrical and Electronics Engineers (IEEE) 802.11, 802.11a, 802.11b, 802.11g, etc. (i.e., 802.11x) standards. Persons of ordinary skill in the art will readily appreciate that any presently known or future developed WLAN standard and/or communication protocol, communication signal and/or communication interface may be implemented between the example VoIP gateway 105 and the example PC Card 110.

Figure 6:
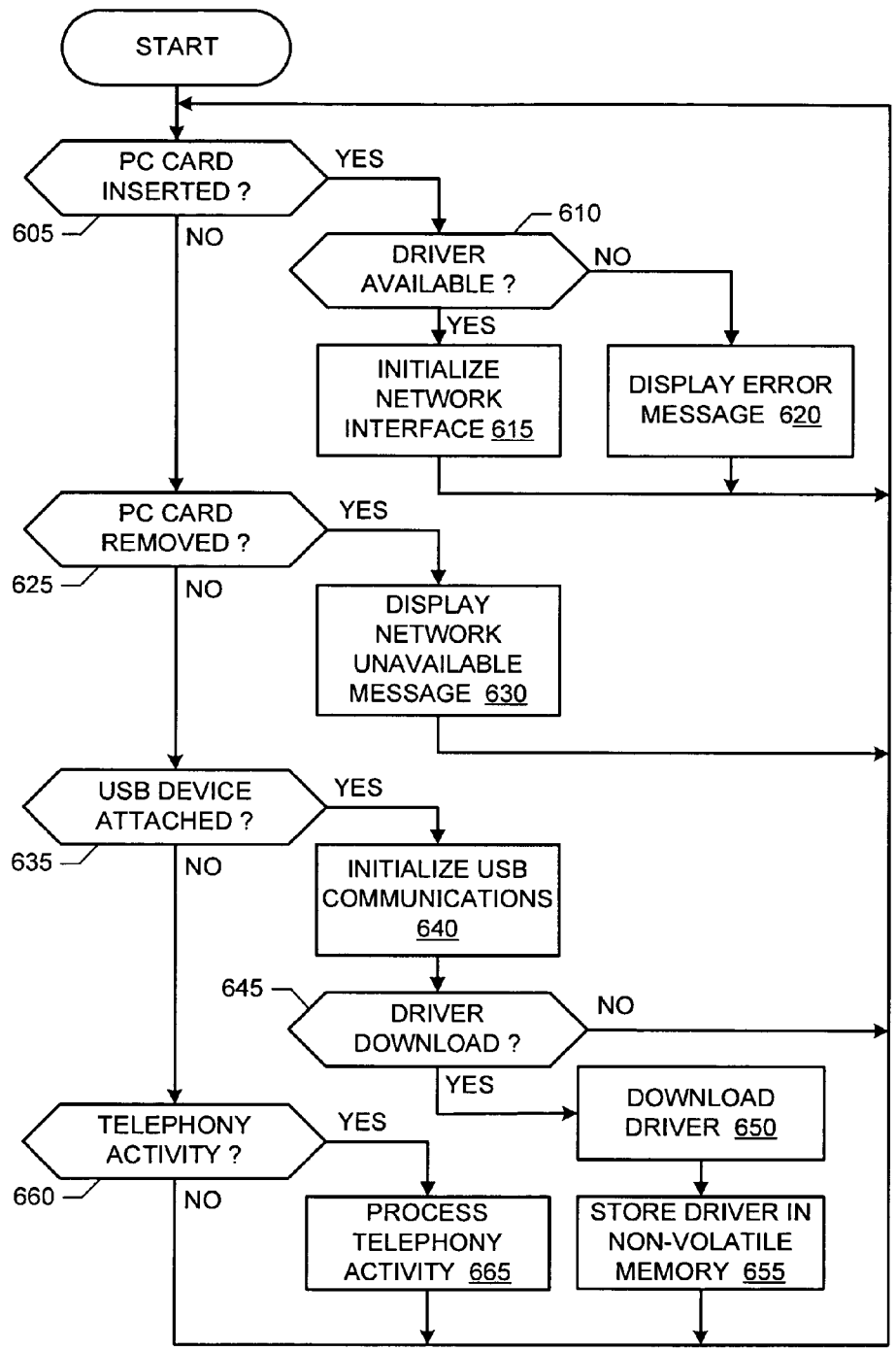
FIG. 6 is a flowchart representative of example machine accessible instructions which may be executed to implement the example VoIP processor of FIG. 3 and, more generally, the example VoIP phone of FIG. 1.

FIG. 6 illustrates a flowchart representative of example machine accessible instructions that may be executed to implement the example VoIP processor 310 of FIG. 4 and/or, more generally, the example VoIP phone 100 of FIG. 1. The example machine readable instructions of FIG. 6 may be executed by a processor, a controller and/or any other suitable processing device. For example, the example machine readable instructions of FIG. 6 may be embodied in coded instructions stored on a tangible medium such as a flash memory, or RAM associated with a processor (e.g., the example RAM 320 associated with the example controller 425 of FIG. 4). Alternatively, some or all of the example flowchart of FIG. 6 may be implemented using an application specific integrated circuit (ASIC), a programmable logic device (PLD), a field programmable logic device (FPLD), discrete logic, hardware, firmware, etc. Also, some or all of the example flowchart of FIG. 6 may be implemented manually or as combinations of any of the foregoing techniques, for example, a combination of firmware, software and/or hardware. Further, although the example machine readable instructions of FIG. 6 are described with reference to the flowchart of FIG. 6, persons of ordinary skill in the art will readily appreciate that many other methods of implementing the example VoIP processor 310 of FIG. 4 and/or, more generally, the example VoIP phone 100 of FIG. 1 may be employed. For example, the order of execution of the blocks may be changed, and/or some of the blocks described may be changed, eliminated, sub-divided and/or combined. Additionally, persons of ordinary skill in the art will appreciate that the example machine readable instructions of FIG. 6 be carried out sequentially and/or carried out in parallel by, for example, separate processing threads, processors, devices, circuits, etc.

The example machine readable instructions of FIG. 6 begin with a VoIP processor checking if a user-replaceable network interface (e.g., the example PC Card 110) has been inserted (block 505). If a PC Card has been inserted (block 505), the VoIP processor determines if a software driver for the inserted PC is available in a memory associated with the VoIP processor (block 510). If a software driver is available (block 510), the VoIP processor initializes the network interface (e.g., the example packet interface 420 and/or a machine accessible instructions executed by the example controller 425 of FIG. 4) (block 515). Control then returns to block 505.

If, on the other hand, a software driver is not available (block 510), the VoIP processor displays, for example, a device error message indicating no applicable software driver is available via, for example, the example display 150 of FIG. 1 (block 520). Control then returns to block 505.

Returning to block 505, if a user-replaceable network interface has not been inserted, the VoIP processor determines if a user-replaceable network interface was removed (block 525). If a user-replaceable network interface (e.g., the example PC Card 110) was removed (block 525), the VoIP processor displays a network unavailable message via, for example, the example display 150 of FIG. 1 (block 530). Control then returns to block 505.

Returning to block 525, if a user-replaceable network interface is not removed, the VoIP processor determines if a USB device has been attached to the example USB interface 160 (block 535). If a USB device has been attached (block 535), the VoIP processor initializes and/or starts communications with the attached USB device using any variety of method and/or technique (block 540). The VoIP processor then determines if the attached USB device is to download a software driver (block 545). If a software driver is to be downloaded (block 545), the VoIP processor downloads the software driver from the attached USB device (block 550) and stores the downloaded software driver in, for example, a non-volatile memory associated with the VoIP processor (block 555). Control then returns to block 505. If a software driver is not be downloaded (block 545), control returns to block 505.

Returning to block 560, if a USB device has not been attached, the VoIP processor determines if any telephony activity is occurring (block 560). Example telephony activities includes a handset taken off-hook, a handset placed on-hook, a number being dialed, an incoming call, received data packets, a time to send a data packet, etc. If a telephony event occurs (block 560), the VoIP processor processes the telephony event using any variety of convention method(s), technique(s) and/or algorithm(s) (block 565). Control then returns to block 505. If a telephony event does not occur (block 560), control returns to block 505.

Referring again to FIG. 3, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware and/or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other rewritable (volatile) memories. Accordingly, the example software and/or firmware described herein can be stored on a tangible storage medium such as those described above or equivalents and successor media.

To the extent the above specification describes example components and functions with reference to particular devices, standards and/or protocols, it is understood that the teachings of the invention are not limited to such devices, standards and/or protocols. For example, VoIP gateways, IEEE 802.11x standards, PC Cards, USB devices. Such devices are periodically superseded by faster or more efficient systems having the same general purpose. Additionally, such standards and/or protocols are replaced with newer and/or more advanced standards having a similar purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A voice over Internet protocol phone comprising:
  a phone housing;
  a memory in the housing;
  a plurality of openings in the phone housing to receive a keypad;
  a bay defined in the phone housing and dimensioned to receive a first user-replaceable network interface, the first user-replaceable network interface to communicatively couple the voice over Internet protocol phone to a voice over Internet protocol gateway using a first communication protocol, the voice over Internet protocol phone and the voice over Internet protocol gateway for use at a same customer premises;
  a second user-replaceable network interface to replace the first user-replaceable network interface, the second user-replaceable network interface to cause the phone to communicate using a second communication protocol different from the first communication protocol;
  a universal serial bus port to communicatively couple the voice over Internet protocol phone to a computer to facilitate installation of a driver associated with at least one of the first or the second user-replaceable network interface on the memory of the voice over Internet protocol phone, the driver to enable the at least one of the first or the second user-replaceable network interface to communicate with the gateway using a corresponding one of the first communication protocol or the second communication protocol; and
  a voice over Internet protocol processor located in the phone housing to download the driver associated with the second user-replaceable network interface via the universal serial bus port to the memory of the voice over Internet protocol phone after the voice over Internet protocol processor is initialized and the first user-replaceable network interface has been replaced with the second user-replaceable network interface.

2. A voice over Internet protocol phone as defined in claim 1, wherein the voice over Internet protocol phone is at least one of a corded voice over Internet protocol phone or a cordless voice over Internet protocol phone.

3. An apparatus comprising:
  a phone housing;
  a voice over Internet protocol processor located in the phone housing;
  a memory;
  a universal serial bus port to communicatively couple the memory to a computer to facilitate installation of a driver associated with a user-replaceable network interface; and
  a bay defined in the phone housing and dimensioned to receive the user-replaceable network interface, the user-replaceable network interface to communicatively couple the apparatus to a voice over Internet protocol gateway, wherein the voice over Internet protocol processor is to download the driver associated with the user-replaceable network interface via the universal serial bus port to the memory after the voice over Internet protocol processor is initialized, the driver to enable the user-replaceable network interface to communicate with the gateway using a first communication protocol, wherein the voice over Internet protocol processor comprises:
    a coder to encode a first signal into compressed transmit data;
    a decoder to decode received compressed data to form a second signal;
    a packetizer to packetize the compressed transmit data and to de-packetize the received compressed data; and
    a packet interface to transmit the compressed transmit data via the user-replaceable network interface and to receive the received compressed data via the user-replaceable network interface.

4. A voice over Internet protocol phone as defined in claim 1, further comprising:
a connector located adjacent to the bay to couple the at least one of the first user-replaceable network interface or the second user-replaceable network interface to the voice over Internet protocol processor;
a handset including a speaker and a microphone;
a keypad; and
a display.

5. A voice over Internet protocol phone as defined in claim 4, wherein the handset is communicatively coupled to the voice over Internet protocol processor via at least one of a wired connection or a wireless connection.

6. A voice over Internet protocol phone as defined in claim 1, wherein the first user-replaceable network interface comprises a user-replaceable Personal Computer card.

7. A voice over Internet protocol phone as defined in claim 1, wherein the at least one of the first user-replaceable network interface or the second user-replaceable network interface is implemented in accordance with a wireless local area network standard.

8. A voice over Internet protocol phone as defined in claim 1, wherein the second user-replaceable network interface is a personal computer card.

9. A voice over Internet protocol phone as defined in claim 1, wherein the voice over Internet protocol processor is to implement non voice over Internet protocol functionality.

10. A method comprising:
inserting a first personal computer card through an opening defined in a housing of a voice over Internet protocol phone;
electrically coupling the inserted first personal computer card to a connector located adjacent the opening in the housing, the first personal computer card to communicatively couple the voice over Internet protocol phone to a voice over Internet protocol gateway, the voice over Internet protocol phone and the voice over Internet protocol gateway located at a same customer premises;
removing the first personal computer card from the voice over Internet protocol phone;
inserting a second personal computer card into the voice over Internet protocol phone to communicatively couple the voice over Internet protocol phone to the voice over Internet protocol gateway according to a wireless communication standard different from a wireless communication standard implemented by the first personal computer card; and
programming, via a universal serial bus, a processor of the voice over Internet protocol phone to interact with the second personal computer card, wherein programming further comprises downloading a driver associated with the second personal computer card via the universal serial bus after the processor is initialized, the driver to enable communication between the second personal computer card and the processor and to enable the second personal computer card to communicate with the gateway using the wireless communication standard implemented by the second personal computer card.

11. A method as defined in claim 10, wherein the voice over Internet protocol phone includes:
a voice over Internet protocol processor;
an analog circuit to connect a handset to the voice over Internet protocol processor; and
a bay defined in the housing and dimensioned to receive at least one of the first or the second user-replaceable personal computer card, the at least one of the first or the second user-replaceable personal computer card implementing a wireless network interface between the voice over Internet protocol phone and the voice over Internet protocol gateway.

12. A method as defined in claim 10, wherein programming the processor of the VoIP phone to interact with the second personal computer card further comprises initializing the driver corresponding to the second personal computer card to facilitate communication between the voice over Internet protocol processor and the second personal computer card.

13. A method comprising:
detecting insertion of a user-replaceable network interface into a voice over Internet protocol phone via a first externally accessible port defined in a housing of the voice over Internet protocol phone;
receiving a driver for the user-replaceable network interface from a computer via a second externally accessible port defined in the housing of the voice over Internet protocol phone, the driver being received after a boot procedure to initialize the voice over Internet protocol phone;
initializing the user-replaceable network interface based on the received driver, the driver to enable the user-replaceable network interface to communicate with a voice over Internet protocol gateway using a communication protocol; and
transmitting packetized data via the user-replaceable network interface to the voice over Internet protocol gateway using the communication protocol associated with the user-replaceable network interface, the voice over Internet protocol phone and the voice over Internet protocol gateway at a same customer premises.

14. A method as defined in claim 13, wherein the voice over Internet protocol phone includes:
a voice over Internet protocol processor;
an analog circuit to connect a handset to the voice over Internet protocol processor; and
a bay defined in the housing and dimensioned to receive the user-replaceable network interface, the user-replaceable network interface implementing a wireless network interface between the voice over Internet protocol phone and the voice over Internet protocol gateway.

15. A method as defined in claim 13, further comprising:
encoding a first signal to form encoded data;
packetizing the encoded data to form the transmitted packetized data;
receiving packetized data via the user-replaceable network interface from the voice over Internet protocol gateway;
de-packetizing the received packetized data; and
decoding the received de-packetized data to form a second signal.

16. A method as defined in claim 15, further comprising:
receiving the first signal from a microphone; and
outputting the second signal via a speaker.

17. A method as defined in claim 13, wherein the driver is to facilitate communication between the user-replaceable network interface and a voice over Internet protocol processor.

18. A method as defined in claim 13, wherein at least one of the first externally accessible port or the second externally accessible port comprises a universal serial bus port.

19. A tangible article of manufacture comprising machine readable instructions which, when executed, cause a machine to at least:
detect insertion of a user-replaceable network interface into a voice over Internet protocol phone via a first externally accessible port defined in a housing of the voice over Internet protocol phone;

receive a driver for the user-replaceable network interface from a computer via a second externally accessible universal serial bus port defined in the housing of the voice over Internet protocol phone, the driver being received after a boot procedure to initialize the voice over Internet protocol phone;

initialize the user-replaceable network interface based on the received driver, the driver to enable the user-replaceable network interface to communicate with a voice over Internet protocol gateway using a communication protocol; and transmit packetized data via the user-replaceable network interface to the voice over Internet protocol gateway using the communication protocol associated with the user-replaceable network interface, the tangible article of manufacture not comprising a propagating signal, the voice over Internet protocol phone and the voice over Internet protocol gateway at a same location.

20. An article of manufacture as defined in claim 19, wherein the voice over Internet protocol phone includes:

a voice over Internet protocol processor;

an analog circuit to connect a handset to the voice over Internet protocol processor; and a bay defined in the phone housing and dimensioned to receive the user-replaceable network interface, the user-replaceable network interface implementing a wireless network interface between the voice over Internet protocol phone and the voice over Internet protocol gateway.

21. An article of manufacture as defined in claim 19, wherein the machine readable instructions, when executed, cause the machine to:

encode a first signal to form encoded data;

packetize the encoded data to form the transmitted packetized data;

receive packetized data via the user-replaceable network interface from the voice over Internet protocol gateway;

de-packetize the received packetized data; and decode the received de-packetized data to form a second signal.

\* \* \* \* \*